US012486707B2

(12) United States Patent
Invernizzi

(10) Patent No.: US 12,486,707 B2
(45) Date of Patent: Dec. 2, 2025

(54) FLAP

(71) Applicant: MOLTENI & C. S.P.A., Monza e Brianza (IT)

(72) Inventor: Stefano Invernizzi, Monza e Brianza (IT)

(73) Assignee: MOLTENI & C. S.P.A., Monza e Brianza (IT)

( * ) Notice: Subject to any disclaimer, the term of this patent is extended or adjusted under 35 U.S.C. 154(b) by 73 days.

(21) Appl. No.: 18/695,980

(22) PCT Filed: Aug. 30, 2022

(86) PCT No.: PCT/IB2022/058100
§ 371 (c)(1),
(2) Date: Mar. 27, 2024

(87) PCT Pub. No.: WO2023/047215
PCT Pub. Date: Mar. 30, 2023

(65) Prior Publication Data

US 2024/0392618 A1 Nov. 28, 2024

(30) Foreign Application Priority Data

Sep. 27, 2021 (IT) ........................ 102021000024650

(51) Int. Cl.
*E05F 3/20* (2006.01)
*E05D 11/04* (2006.01)
*E05F 1/12* (2006.01)

(52) U.S. Cl.
CPC .............. *E05F 3/20* (2013.01); *E05F 1/1215* (2013.01); *E05D 2011/045* (2013.01); *E05Y 2201/224* (2013.01)

(58) Field of Classification Search
CPC .. E05F 3/20; E05F 1/1215; E05F 5/00; E05D 11/06; E05D 7/009; E05D 2011/045
See application file for complete search history.

(56) References Cited

U.S. PATENT DOCUMENTS 1,226,258 A * 5/1917 Rogers ...................... E05F 3/20 16/54
5,720,082 A * 2/1998 Rossmo .................... E05D 7/02 16/244

(Continued)

FOREIGN PATENT DOCUMENTS

DE 102009035682 A1 2/2011
DE 102018003920 A1 11/2019

(Continued)

OTHER PUBLICATIONS

International Search Report for corresponding application PCT/IB2022/058100 filed Aug. 30, 2022; Mail date Nov. 15, 2022.

(Continued)

*Primary Examiner* — Jeffrey O'Brien
(74) *Attorney, Agent, or Firm* — CANTOR COLBURN LLP

(57) ABSTRACT

A flap including a structure and a door hinged to the structure by means of a hinge, where the hinge defines a hinge axis around which the door is rotationally movable with respect to the structure, where the door is movable from a vertical closing position to a horizontal opening position under the action of the force of gravity, where the flap further includes damping means configured to dampen the rotation motion of the door with respect to the structure, where the hinge defines a housing compartment therein, closed or partially closed in the direction transverse to the hinge axis, and where the damping means are housed inside the housing compartment.

8 Claims, 6 Drawing Sheets

(56) References Cited

U.S. PATENT DOCUMENTS

| | | | | |
|---|---|---|---|---|
| 6,212,734 | B1 * | 4/2001 | Commons | E05D 11/04<br>16/244 |
| 6,725,504 | B1 * | 4/2004 | Dickson | E05D 7/04<br>200/61.7 |
| 9,926,732 | B2 * | 3/2018 | Bacchetti | E05F 3/20 |
| 10,597,919 | B2 * | 3/2020 | Schulte | E05D 11/04 |
| 12,366,100 | B2 * | 7/2025 | Talpe | E05F 3/20 |
| 2005/0246863 | A1 * | 11/2005 | Chesworth | E05D 7/081<br>16/221 |
| 2017/0009505 | A1 * | 1/2017 | Adoline | E05F 1/12 |
| 2023/0304347 | A1 * | 9/2023 | Boundy | E05F 3/18 |

FOREIGN PATENT DOCUMENTS

| | | | |
|---|---|---|---|
| EP | 3115537 | A1 | 1/2017 |
| KR | 20110018994 | A | 2/2011 |

OTHER PUBLICATIONS

Written Opinion of the International Searching Authority for corresponding application PCT/IB2022/058100 filed Aug. 30, 2022; Mail date Nov. 15, 2022.

International Preliminary Report on Patentablity for corresponding application PCT/IB2022/058100 filed Aug. 30, 2022; Mail date Nov. 28, 2023.

* cited by examiner

FLAP

TECHNICAL FIELD

The present disclosure relates to a flap.

BACKGROUND ART

Flaps formed by a structure defining an inner compartment and an opening, and a folding door hinged to the structure by means of a hinge, so as to open and close the opening defined by the structure, are known.

The door is thus rotationally movable with respect to the structure from a vertical closing position to a horizontal opening position under the action of the force of gravity.

It is known to provide the flaps with damping means configured to counteract the free opening of the door under the action of the force of gravity so as to make the opening movement of the door safer and to avoid sudden openings, impacts, and damage to the flap.

However, the presence of such damping means considerably affects the aesthetic appearance of the flap, since they are visible and discontinuous with the design of the flap.

BRIEF SUMMARY

The disclosure provides a flap such as to obviate at least some of the drawbacks of the prior art.

The disclosure provides an improved flap combining the opposite needs of ensuring a controlled and safe opening movement of the door without simultaneously compromising the aesthetic appearance of the flap.

BRIEF DESCRIPTION OF THE DRAWINGS

In order to better understand the disclosure and appreciate the advantages thereof, some non-limiting exemplary embodiments thereof will be described below with reference to the accompanying drawings, in which.

DETAILED DESCRIPTION

Figure 1:
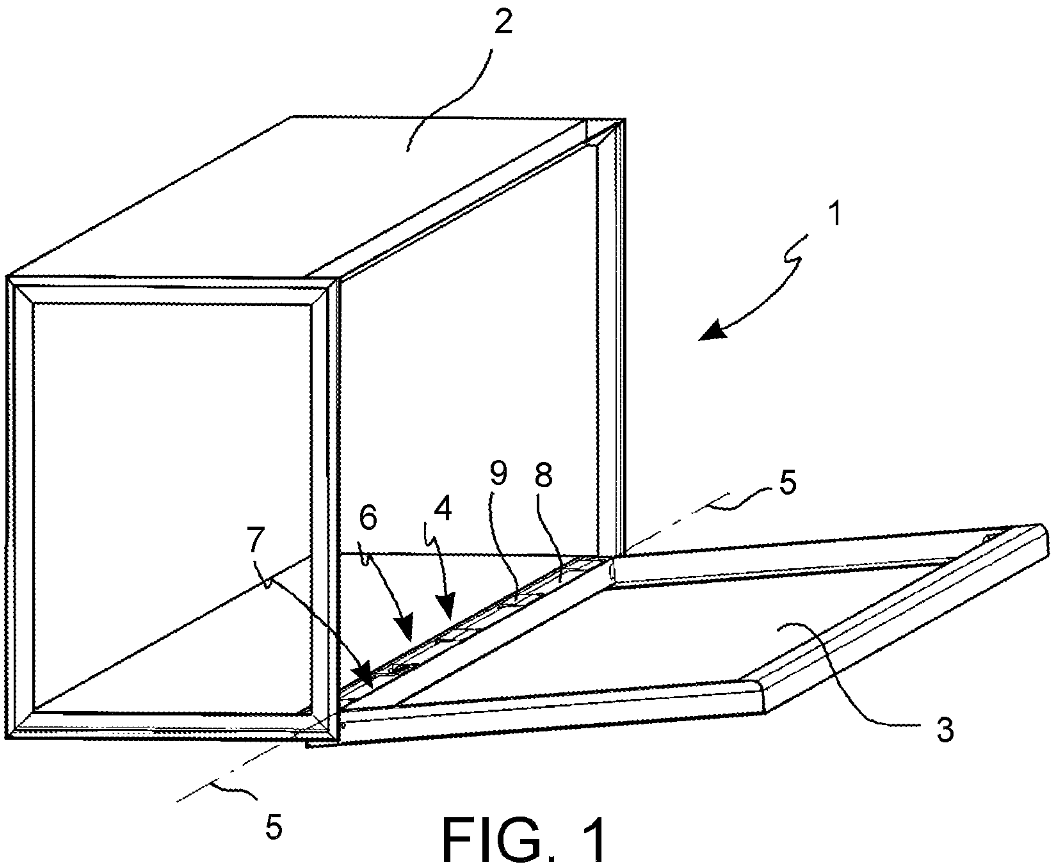
FIG. 1 is a perspective view of a flap according to an embodiment of the disclosure.
Figure 2:
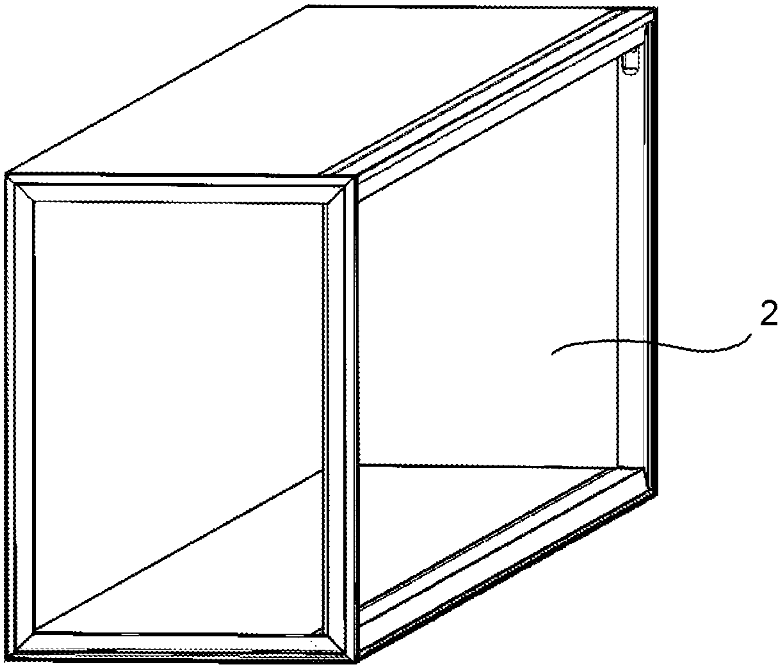
FIG. 2 is a perspective view of a component of a flap, according to an embodiment of the disclosure.
Figure 3:
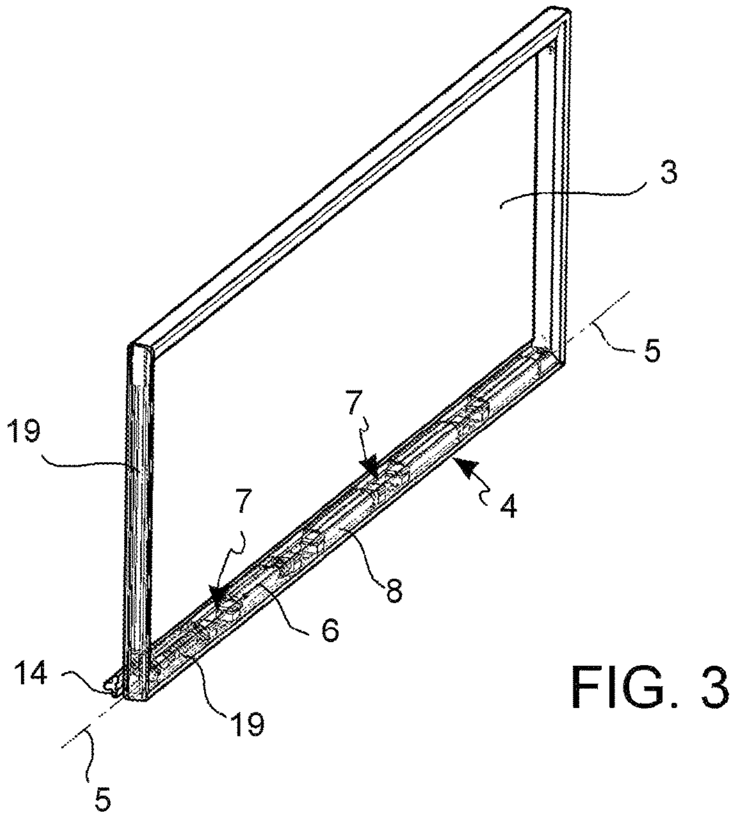
FIG. 3 is a perspective view of a further component of a flap, according to an embodiment of the disclosure.
Figure 4:
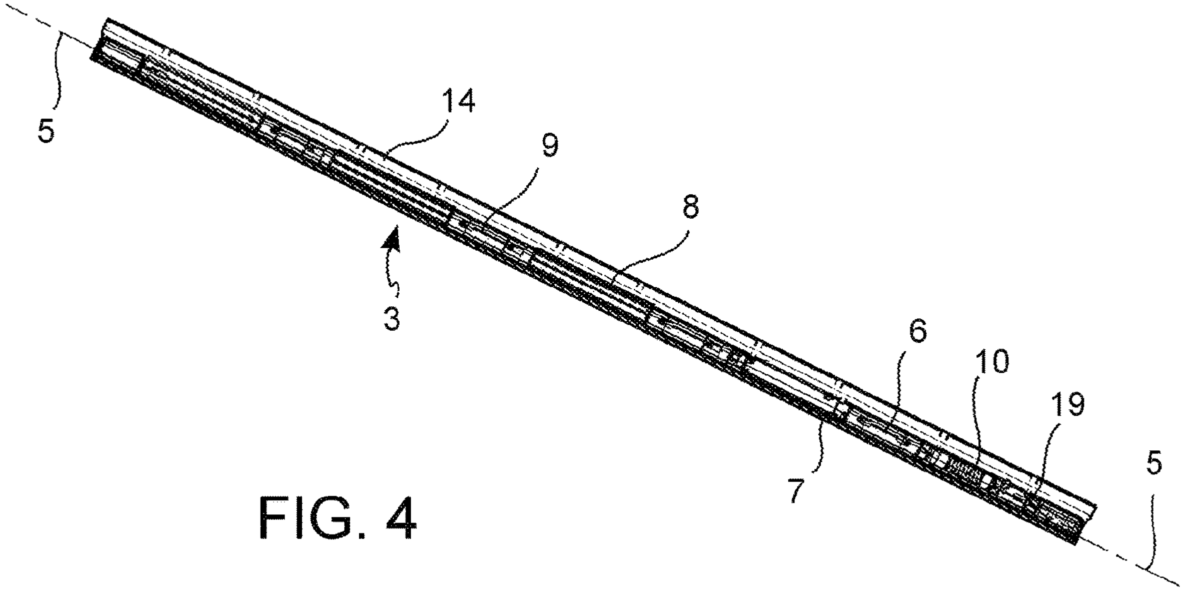
FIG. 4 is a perspective view of a further component of a flap, according to an embodiment of the disclosure.
Figure 5:
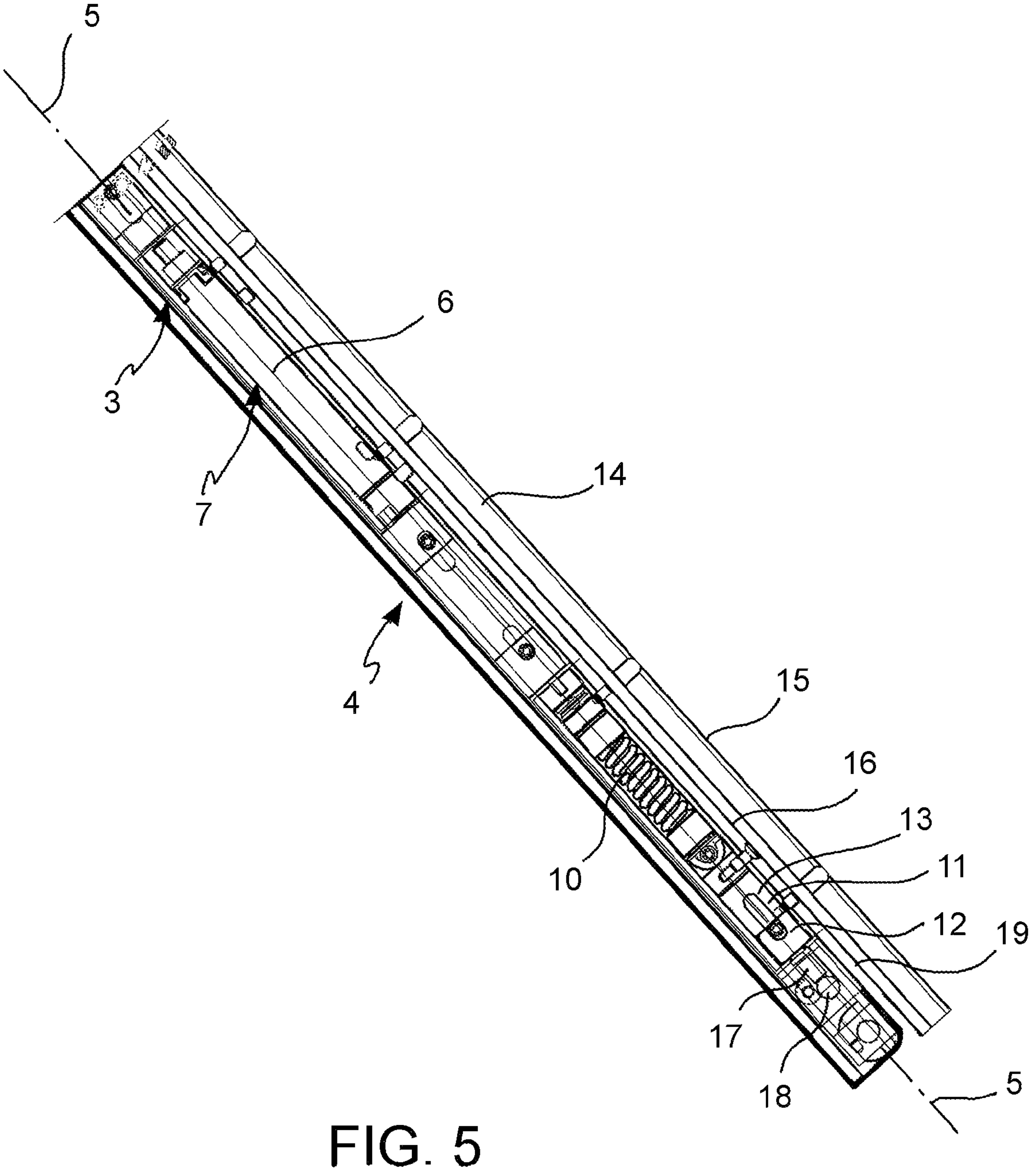
FIG. 5 is a detailed view of the component depicted in FIG. 4.
Figure 6:
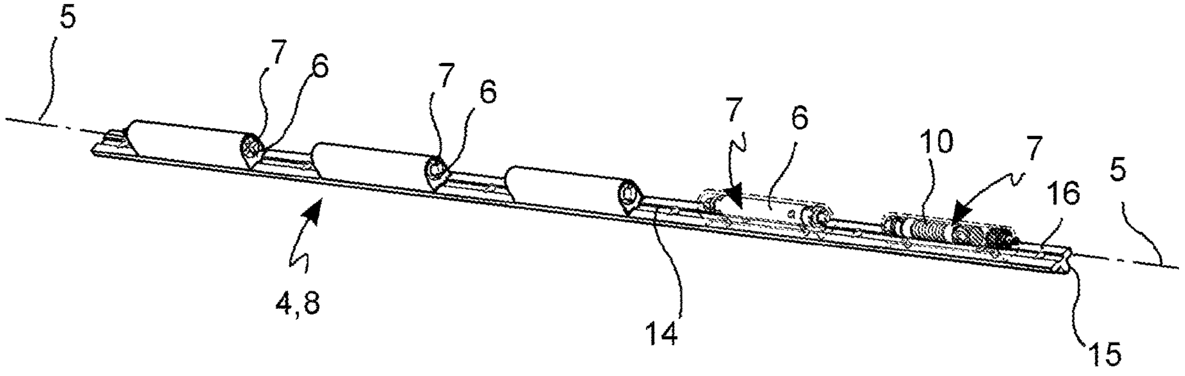
FIG. 6 is a perspective view of a component of a flap, according to an embodiment of the disclosure.
Figure 7:
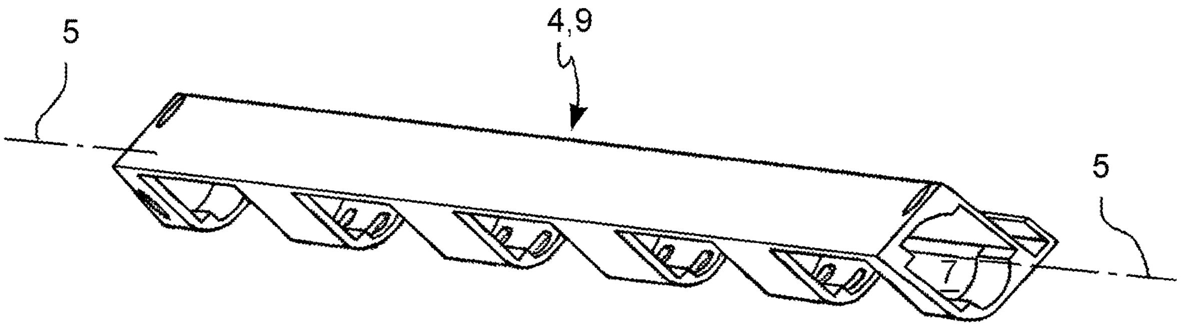
FIG. 7 is a perspective view of a further component of a flap, according to an embodiment of the disclosure.
Figure 8:
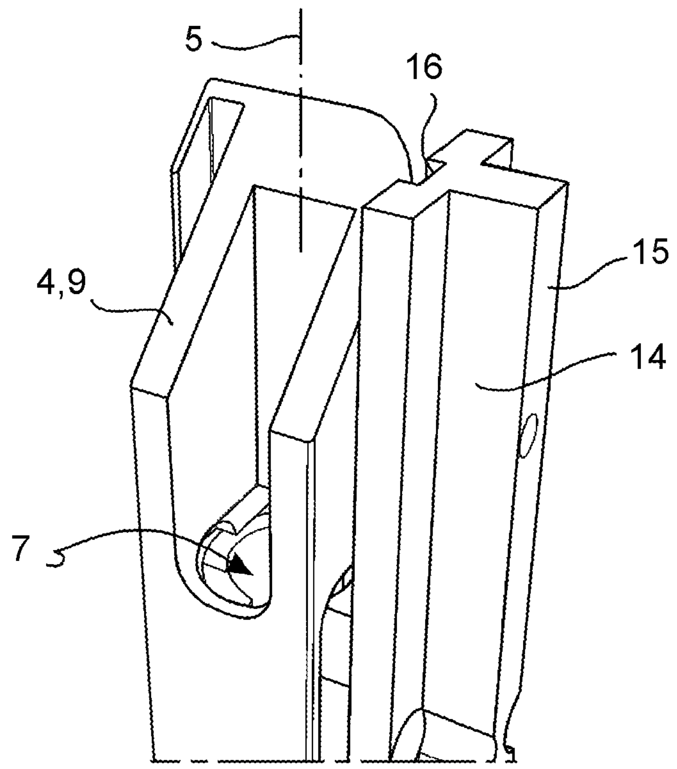
FIG. 8 is a detailed view of a component of a flap, according to an embodiment of the disclosure.
Figure 9:
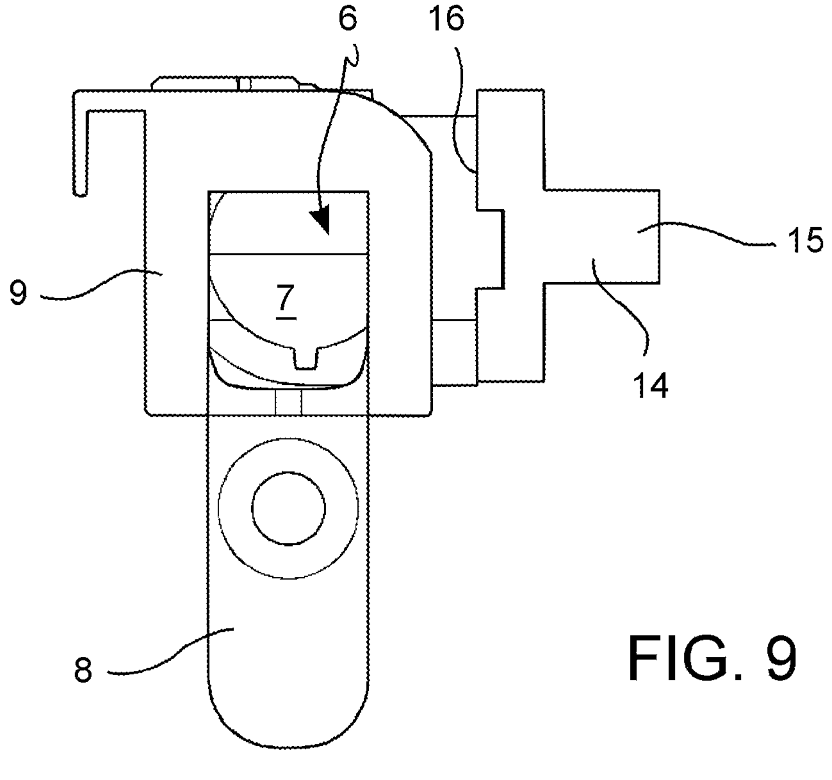
FIG. 9 is a top view of the detail depicted in FIG. 8.
Figure 10:
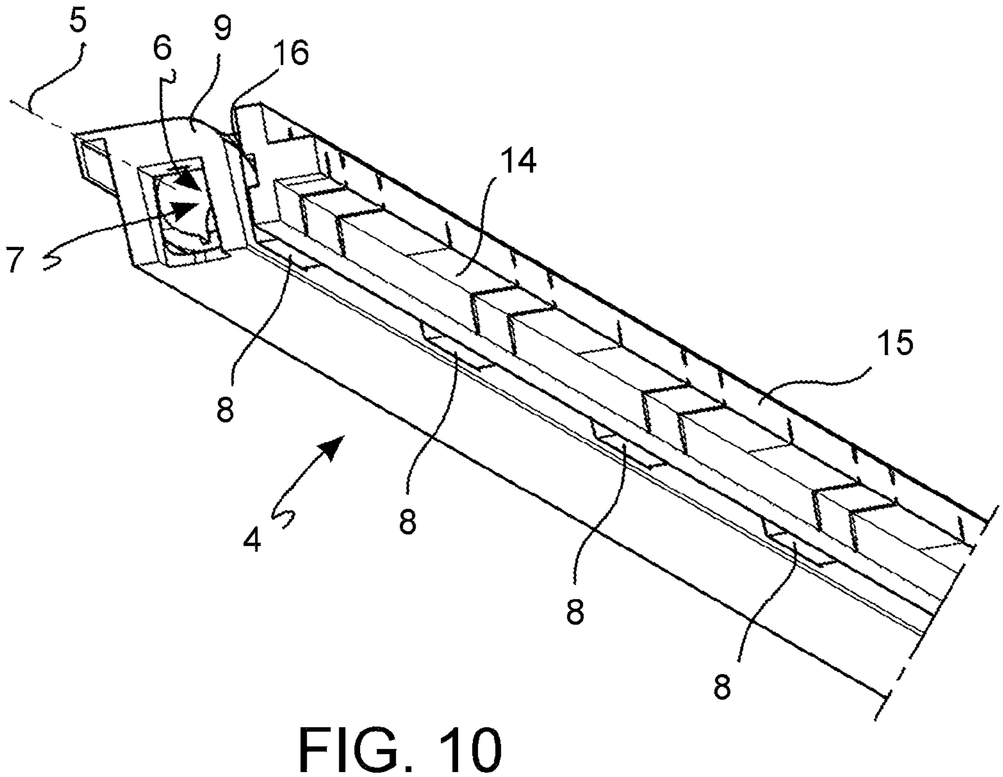
FIG. 10 is a detailed perspective view of a component of a flap, according to an embodiment of the disclosure.
Figure 11:
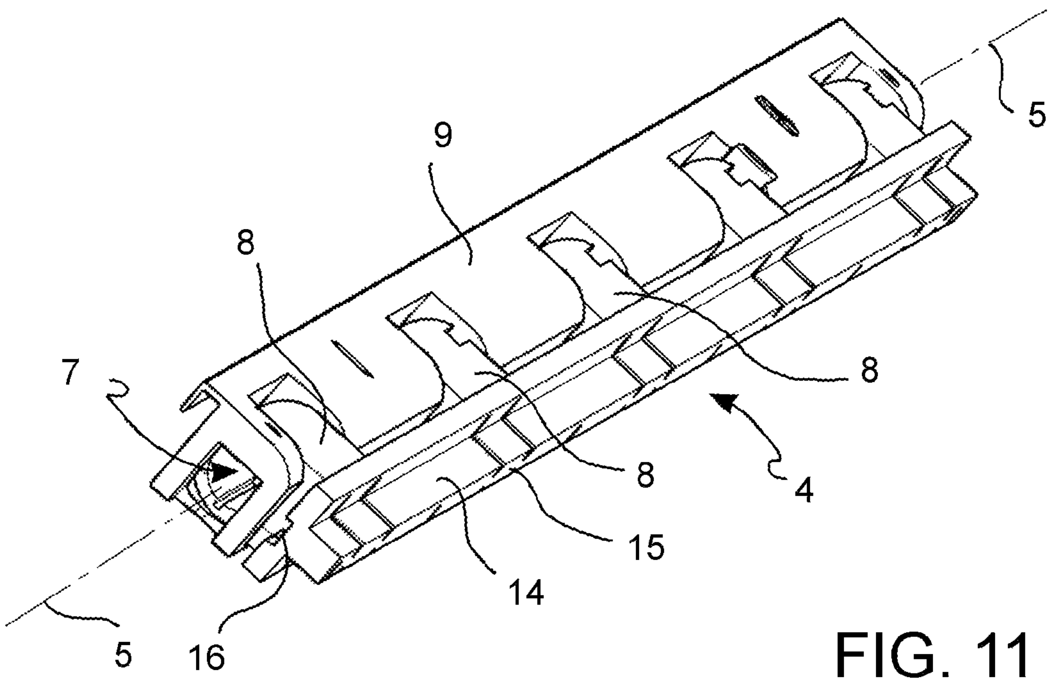
FIG. 11 is a further detailed perspective view of the component depicted in FIG. 10.

With reference to the drawings, a flap is generally indicated by reference numeral 1.

Flap 1 comprises a structure 2 and a door 3.

Door 3 is hinged to structure 2 by means of a hinge 4.

Hinge 4 defines a hinge axis 5 around which door 3 is rotationally movable with respect to structure 2.

Door 3 is movable from a vertical closing position to a horizontal opening position under the action of the force of gravity.

Flap 1 further comprises damping means 6.

The damping means 6 are configured to dampen the rotation motion of door 3 with respect to structure 2.

According to an aspect of the disclosure, hinge 4 defines a housing compartment 7 therein, closed or partially closed in the direction transverse to the hinge axis 5.

Moreover, the damping means 6 are housed inside the housing compartment 7.

Advantageously, the damping means 6 are concealed because they are positioned in a housing compartment 7 inside hinge 4.

On the one hand, this allows to have a flap in which the movement of door 3 is reliable, safe and controlled, and on the other, not to affect the appearance of flap 1.

Specifically, structure 2 comprises a cover, a base wall opposite to the cover, two opposite shoulders, a bottom wall, and defines an opening opposite to the bottom wall and closable by the door 3.

According to an embodiment, hinge 4 defines a plurality of housing compartments 7.

The plurality of housing compartments 7 is defined in a position substantially coaxial to the hinge axis 5.

According to an embodiment, hinge 4 comprises at least a first hinge body 8 and at least a second hinge body 9 hinged to each other.

The housing compartment 7 is defined by the at least a first hinge body 8 and the at least a second hinge body 9 so that the damping means 6 are partially housed inside the at least a first hinge body 8 and partially housed inside the at least a second hinge body 9.

According to an embodiment, the damping means 6 comprise at least one rotating damper.

Alternatively, the damping means comprise an axial damper.

In particular, the damping means 6 comprise an axial roll damper, also referred to as an axial barrel damper.

According to an embodiment, the housing compartment 7 is said coaxial to the hinge axis 5.

According to an embodiment, the damping means 6 are positioned so that the hinge axis 5 passes through the damping means 6.

According to a preferred embodiment, the damping means 6 are positioned coaxially to the hinge axis 5.

According to an embodiment, the damping means 6 comprise from two to six dampers.

According to a preferred embodiment, the damping means 6 comprise four dampers.

According to an embodiment, all dampers are positioned coaxially to the hinge axis 5.

According to an embodiment, flap 1 comprises elastic connection means 10 which connect the door 3 to structure 2.

The elastic connection means 10 are configured to allow a complete opening of door 3 under the action of the force of gravity, and to return door 3 to the closing position.

Advantageously, the elastic connection means 10 reduce the force required to close the door 3.

According to an embodiment, the elastic connection means 10 are housed inside the housing compartment 7.

According to an embodiment, the elastic connection means 10 comprise a torsion spring.

According to an embodiment, the elastic connection means 10 are positioned coaxially to the hinge axis 5.

According to an embodiment, the elastic connection means 10 comprise a plurality of torsion springs.

According to a preferred embodiment, the elastic connection means 10 comprise two torsion springs, each of which positioned at a respective end of door 3, at hinge 5.

According to an embodiment, the two torsion springs are positioned coaxially to the hinge axis 5.

According to an embodiment, flap 1 comprises a mechanical stop 11.

The mechanical stop 11 is configured to determine the stroke end of the opening of door 3.

According to an embodiment, the mechanical stop 11 comprises a first stop body 12 connected to a second stop body 13.

The first stop body 12 is rotationally connected to the second stop body 13.

The first stop body 12 is connected to structure 2, while the second stop body 13 is connected to door 3.

According to an embodiment, one of the first stop body 12 and the second stop body 13 defines a recessed track delimited by a stroke-end wall which defines the opening stroke of door 3.

The other of the first stop body 12 and the second stop body 13 forms a sliding tooth configured to create a sliding geometric connection with the recessed track.

Advantageously, when opening door 3, the sliding tooth slides into the recessed track, up to abutting against the stroke-end wall so as to avoid a further rotation of door 3 past the stroke end determined by the stroke-end wall.

According to an embodiment, the mechanical stop 11 is housed inside the housing compartment 7.

According to an embodiment, the mechanical stop 11 is positioned coaxially to the hinge axis 5.

According to an embodiment, both the first stop body 12 and the second stop body 13 are positioned coaxially to the hinge axis 5 so that the first stop body 12 and the second stop body 13 rotate with respect to each other about hinge axis 5.

According to an embodiment, the mechanical stop 11 defines a stroke of door 3 of about 90°.

According to an embodiment, flap 1 comprises a bracket 19 integrated in door 3.

According to an embodiment, bracket 19 comprises at least one rotation pin 17 positioned at hinge 4.

The rotation pin 17 extends coaxially to the hinge axis 5.

Moreover, structure 2 comprises a ball 18 positioned at hinge 4.

According to this embodiment, the rotation pin 17 is positioned in contact with ball 18.

Advantageously, ball 18 guides the rotation of the rotation pin 17, and therefore of door 3, thus decreasing the frictions generated by the rotation of door 3 with respect to structure 2.

According to an embodiment, flap 1 comprises an engagement bar 14 configured to connect door 3 to structure 2.

The engagement bar 14 defines an engagement wall 15 and an opposite fastening wall 16.

The engagement wall 15 is engaged in structure 2.

The fastening wall 16 is fastened to hinge 4.

Specifically, the fastening wall 16 is fastened to the first hinge bodies 8.

According to an embodiment, the engagement wall 15 defines a cross-shaped section on a plane transverse to hinge 5.

Specifically, on a plane transverse to hinge 5, the engagement wall 15 defines a profile transverse to door 3 in the closing position, while the fastening wall 16 defines a profile parallel to door 3 in the closing position.

Advantageously, an engagement bar 14 thus configured ensures high strength and reliability for the movement system of door 3 with respect to structure 2.

Obviously, those skilled in the art will be able to make changes or adaptations to the present disclosure, without however departing from the scope of the following claims.

The invention claimed is:

1. A flap comprising:
- a structure, and
- a door hinged to the structure by means of a hinge,
- wherein the hinge defines a hinge axis around which the door is rotationally movable with respect to the structure,
- wherein the door is movable from a vertical closing position to a horizontal opening position under the action of the force of gravity,
- wherein the flap further comprises damping means configured to dampen the rotation motion of the door with respect to the structure,
- wherein the hinge defines a housing compartment therein, which is closed or partially closed in the direction transverse to the hinge axis, and
- wherein the damping means are housed inside the housing compartment,
- the flap further comprising a bracket integrated in the door,
- wherein the bracket comprises at least one rotation pin positioned at the hinge,
- wherein the rotation pin extends coaxially to the hinge axis,
- wherein the structure comprises a ball positioned at the hinge, and
- wherein the rotation pin is positioned in contact with the ball.

2. The flap according to claim 1, wherein the hinge comprises at least a first hinge body and at least a second hinge body hinged to each other, and wherein the housing compartment is defined by the at least a first hinge body and by the at least a second hinge body so that the damping means are partially housed inside the at least a first hinge body and partially housed inside the at least a second hinge body.

3. The flap according to claim 1 wherein the damping means comprise at least one rotating damper or an axial damper.

4. The flap according to claim 1, wherein the housing compartment is defined coaxially to the hinge axis,
- and/or wherein the hinge defines a plurality of housing compartments, wherein optionally said plurality of housing compartments is defined in a substantially coaxial position to the hinge axis.

5. The flap according to claim 1, wherein the damping means are positioned so that the hinge axis passes through the damping means,
- and/or wherein the damping means are positioned coaxially to the hinge axis,
- and/or wherein the damping means comprise from two to six dampers,
- or wherein the damping means comprise four dampers,
- and/or wherein all dampers are positioned coaxially to the hinge axis.

6. The flap according to claim 1, comprising elastic connection means which connect the door to the structure, wherein the elastic connection means are configured to allow a complete opening of the door under the action of the force of gravity, and to return the door to the closing position, and/or wherein the elastic connection means are housed inside the housing compartment, and/or wherein the elastic connection means comprise a torsion spring, and/or wherein the elastic connection means are positioned coaxially to the hinge axis, and/or wherein the elastic connection means comprise a plurality of torsion springs, and/or wherein the elastic connection means comprise two torsion springs, each of which positioned at a respective end of the door, at the hinge, and/or wherein the two torsion springs are positioned coaxially to the hinge axis.

7. The flap according to claim 1, comprising a mechanical stop configured to determine the stroke end of the opening of the door, and optionally, wherein the mechanical stop comprises a first stop body connected to a second stop body, wherein the first stop body is rotationally connected to the second stop body, wherein the first stop body is connected to the structure, while the second stop body is connected to the door, wherein one of the first stop body and the second stop body defines a recessed track delimited by a stroke end wall which defines the opening stroke of the door, and wherein the other of the first stop body and the second stop body forms a sliding tooth configured to create a sliding geometric connection with the recessed track, and/or wherein the mechanical stop is housed inside the housing compartment, and/or wherein the mechanical stop is positioned coaxially to the hinge axis, and/or wherein both the first stop body and the second stop body are positioned coaxially to the hinge axis so that the first stop body and the second stop body rotate with respect to each other about the hinge axis, and/or wherein the mechanical stop defines a stroke of the door of about 90°.

8. The flap according to claim 1, comprising an engagement bar configured to connect the door to the structure, wherein the engagement bar defines an engagement wall and an opposite fastening wall, wherein the engagement wall is engaged in the structure, wherein the fastening wall is fastened to the hinge, optionally to the first hinge bodies of the hinge, and wherein the coupling wall defines, on a plane transverse to the hinge axis, a cross-shaped section.

* * * * *